(12) United States Patent
Tseng et al.

(10) Patent No.: US 11,375,176 B2
(45) Date of Patent: Jun. 28, 2022

(54) FEW-SHOT VIEWPOINT ESTIMATION

(71) Applicant: NVIDIA Corporation, Santa Clara, CA (US)

(72) Inventors: Hung-Yu Tseng, Merced, CA (US); Shalini De Mello, San Francisco, CA (US); Jonathan Tremblay, Redmond, WA (US); Sifei Liu, Santa Clara, CA (US); Jan Kautz, Lexington, MA (US); Stanley Thomas Birchfield, Sammamish, WA (US)

(73) Assignee: NVIDIA CORPORATION, Santa Clara, CA (US)

( * ) Notice: Subject to any disclaimer, the term of this patent is extended or adjusted under 35 U.S.C. 154(b) by 0 days.

(21) Appl. No.: 16/780,738

(22) Filed: Feb. 3, 2020

(65) Prior Publication Data
US 2020/0252600 A1    Aug. 6, 2020

Related U.S. Application Data

(60) Provisional application No. 62/801,498, filed on Feb. 5, 2019.

(51) Int. Cl.
*H04N 13/282*    (2018.01)
*H04N 13/268*    (2018.01)
*G06K 9/62*      (2022.01)
*G06N 3/08*      (2006.01)

(52) U.S. Cl.
CPC ......... *H04N 13/282* (2018.05); *G06K 9/6256* (2013.01); *G06N 3/08* (2013.01); *H04N 13/268* (2018.05)

(58) Field of Classification Search
None
See application file for complete search history.

(56) References Cited

U.S. PATENT DOCUMENTS

2019/0122077 A1*    4/2019   Tsishkou ............... G06K 9/629

OTHER PUBLICATIONS

Wang, Yu-Xiong, and Martial Hebert. "Learning to learn: Model regression networks for easy small sample learning." European Conference on Computer Vision. Springer, Cham, 2016.*
Xiang et al., "ObjectNet3D: A Large Scale Database for 3D Object Recognition," ECCV, 2016, pp. 1-16, retrieved from https://cvgl.stanford.edu/publications.html#2016.
Xiang et al., "Beyond Pascal: A Benchmark for 3D Object Detection in the Wild," IEEE Winter Conference on Applications of Computer Vision, 2014, pp. 1-18.

(Continued)

*Primary Examiner* — Jason A Pringle-Parker
(74) *Attorney, Agent, or Firm* — Zilka-Kotab, P.C.

(57) ABSTRACT

When an image is projected from 3D, the viewpoint of objects in the image, relative to the camera, must be determined. Since the image itself will not have sufficient information to determine the viewpoint of the various objects in the image, techniques to estimate the viewpoint must be employed. To date, neural networks have been used to infer such viewpoint estimates on an object category basis, but must first be trained with numerous examples that have been manually created. The present disclosure provides a neural network that is trained to learn, from just a few example images, a unique viewpoint estimation network capable of inferring viewpoint estimations for a new object category.

19 Claims, 8 Drawing Sheets

(56) References Cited

OTHER PUBLICATIONS

Xiang et al., "PoseCNN: A Convolutional Neural Network for 6D Object Pose Estimation in Cluttered Scenes," RSS, 2018, 10 pages, retrieved from https://arxiv.org/abs/1711.00199.
Yu et al., "Multi-Scale Context Aggregation by Dilated Convolutions," ICLR, 2016, pp. 1-13.
Zhou et al., "StarMap for Category-Agnostic Keypoint and Viewpoint Estimation," ECCV, 2018, pp. 1-22, retrieved from https://paperswithcode.com/paper/starmap-for-category-agnostic-keypoint-and.
Kingma et al., "Adam: A Method for Stochastic Optimization," ICLR, 2015, pp. 1-15.
Li et al., "Meta-SGD: Learning to Learn Quickly for Few-Shot Learning," Machine Learning, 2017, pp. 1-11, retrieved from https://arxiv.org/abs/1707.09835.
Paszke et al., "Automatic differentiation in PyTorch," 31st Conference on Neural Information Processing Systems, 2017, pp. 1-4.
Wah et al., "The Caltech-UCSD Birds-200-2011 Dataset," Computation & Neural Systems Technical Report, 2011, 8 pages, retrieved from https://authors.library.caltech.edu/27452/.
Andrychowicz et al., "Learning to learn by gradient descent by gradient descent," 30th Conference on Neural Information Processing Systems, 2016, pp. 1-9.
Bay et al., "Speeded-Up Robust Features (SURF)," Computer Vision and Image Understanding, vol. 110, Dec. 15, 2007, pp. 346-359.
Cao et al., "Realtime Multi-Person 2D Pose Estimation using Part Affinity Fields," Computer Vision and Pattern Recognition (CVPR), 2017, pp. 7291-7299.
Chang et al., "ShapeNet: An Information-Rich 3D Model Repository," CPVR, Dec. 9, 2015, pp. 1-11, retrieved from https://arxiv.org/abs/1512.03012.
Deng et al., "ImageNet: A Large-Scale Hierarchical Image Database," Proceedings of IEEE Computer Society Conference on Computer Vision and Pattern Recognition, Jun. 2009, 9 pages.
Finn et al., "Model-Agnostic Meta-Learning for Fast Adaptation of Deep Networks," Proceedings of the 34 th International Conference on Machine Learning PMLR, vol. 70, 2017, 10 pages.
Gidaris et al., "Dynamic Few-Shot Visual Learning without Forgetting," IEEE Conference on Computer Vision and Pattern Recognition (CVPR), 2018, pp. 4367-4375, retrieved from http://openaccess.thecvf.com/content_cvpr_2018/html/Gidaris_Dynamic_Few-Shot_Visual_CVPR_2018_paper.html.
Grabner et al., "3D Pose Estimation and 3D Model Retrieval for Objects in the Wild," IEEE Conference on Computer Vision and Pattern Recognition (CVPR), 2018, pp. 3022-3031, retrieved from http://openaccess.thecvf.com/content_cvpr_2018/html/Grabner_3D_Pose_Estimation_CVPR_2018_paper.html.
Gui et al., "Few-Shot Human Motion Prediction via Meta-learning," Proceedings of European Conference on Computer Vision (ECCV), Oct. 2018, pp. 441-459.
He et al., "Deep Residual Learning for Image Recognition," The IEEE Conference on Computer Vision and Pattern Recognition (CVPR), 2016, pp. 770-778, retrieved from http://openaccess.thecvf.com/content_cvpr_2016/html/He_Deep_Residual_Learning_CVPR_2016_paper.html.
Hinterstoisser et al., "Model Based Training, Detection and Pose Estimation of Texture-Less 3D Objects in Heavily Cluttered Scenes," Proceeds of Computer Vision—ECCV 2012 Workshops and Demonstrations Proceedings Part III, Oct. 2012, pp. 1-14, retrieved from https://www.researchgate.net/publication/242071696_Model_Based_Training_Detection_and_Pose_Estimation_of_Texture-Less_3D_Objects_in_Heavily_Cluttered_Scenes.
Hodan et al., "T-LESS: An RGB-D Dataset for 6D Pose Estimation of Texture-less Objects," 2017 IEEE Winter Conference on Applications of Computer Vision, 2017, pp. 880-888.
Kanezaki et al., "RotationNet: Joint Object Categorization and Pose Estimation Using Multiviews from Unsupervised Viewpoints," IEEE Conference on Computer Vision and Pattern Recognition (CVPR), 2018, pp. 5010-5019, retrieved from http://openaccess.thecvf.com/content_cvpr_2018/html/Kanezaki_RotationNet_Joint_Object_CVPR_2018_paper.html.
Kehl et al., "SSD-6D: Making RGB-based 3D detection and 6D pose estimation great again," ICCV, Nov. 27, 2017, 9 pages, retrieved from https://paperswithcode.com/paper/ssd-6d-making-rgb-based-3d-detection-and-6d.
Kundu et al., "3D-RCNN: Instance-level 3D Object Reconstruction via Render-and-Compare," IEEE Conference on Computer Vision and Pattern Recognition, 2018, pp. 3559-3568, retrieved from http://openaccess.thecvf.com/content_cvpr_2018/html/Kundu_3D-RCNN_Instance-Level_3D_CVPR_2018_paper.html.
Kuznetsova et al., "Exploiting View-Specific Appearance Similarities Across Classes for Zero-Shot Pose Prediction: A Metric Learning Approach," Proceedings of the Thirtieth AAAI Conference on Artificial Intelligence, 2016, pp. 3523-3529.
Lake et al., "Human-level concept learning through probabilistic program induction," Cognitive Science, vol. 350, No. 6266, Dec. 11, 2015, pp. 1332-1338.
Lepetit et al., "EPnP: An Accurate O(n) Solution to the PnP Problem," International Journal of Computer Vision, 2008, 12 pages.
Lowe, D. G., "Distinctive Image Features from Scale-Invariant Keypoints," International Journal of Computer Vision, Jan. 2004, pp. 1-28.
Mahendran et al., "Convolutional Networks for Object Category and 3D Pose Estimation from 2D Images," CVPR, Jul. 20, 2018, 17 pages, retrieved from https://arxiv.org/abs/1711.07426.
Massa et al., "Crafting a multi-task CNN for viewpoint estimation," CVPR, Sep. 13, 2016, pp. 1-12, retrieved from https://arxiv.org/abs/1609.03894.
Massa et al., "Deep Exemplar 2D-3D Detection by Adapting from Real to Rendered Views," CVPR, 2016, pp. 6024-6033, retrieved from http://openaccess.thecvf.com/content_cvpr_2016/papers/Massa_Deep_Exemplar_2D-3D_CVPR_2016_paper.pdf.
Mousavian et al., "3D Bounding Box Estimation Using Deep Learning and Geometry," CVPR, 2017, pp. 7074-7082, retrieved from http://openaccess.thecvf.com/content_cvpr_2017/papers/Mousavian_3D_Bounding_Box_CVPR_2017_paper.pdf.
Newell et al., "Stacked Hourglass Networks for Human Pose Estimation," CVPR, Jul. 26, 2016, 17 pages, retrieved from https://arxiv.org/abs/1603.06937.
Nichol et al., "On First-Order Meta-Learning Algorithms," arXiv, 2018, pp. 1-15, retrieved from https://arxiv.org/abs/1803.02999.
Park et al., "Meta-Tracker: Fast and Robust Online Adaptation for Visual Object Trackers," European Conference on Computer Vision, 2018, 17 pages, retrieved from http://openaccess.thecvf.com/content_ECCV_2018/html/Eunbyung_Park_Meta-Tracker_Fast_and_ECCV_2018_paper.html.
Pavlakos et al., "6-DoF Object Pose from Semantic Keypoints," IEEE International Conference on Robotics and Automation, 2017, 8 pages, retrieved from http://www.cad.zju.edu.cn/home/xzhou/publication/icra2017object/.
Qiao et al., "Few-Shot Image Recognition by Predicting Parameters From Activations," IEEE Conference on Computer Vision and Pattern Recognition, 2018, 10 pages, retrieved from http://openaccess.thecvf.com/content_cvpr_2018/html/Qiao_Few-Shot_Image_Recognition_CVPR_2018_paper.html.
Rad et al., "BB8: A Scalable, Accurate, Robust to Partial Occlusion Method for Predicting the 3D Poses of Challenging Objects without Using Depth," ICCV, 2017, pp. 3828-3836, retrieved from http://openaccess.thecvf.com/content_ICCV_2017/papers/Rad_BB8_A_Scalable_ICCV_2017_paper.pdf.
Rad et al., "Feature Mapping for Learning Fast and Accurate 3D Pose Inference from Synthetic Images," CVPR, 2018, pp. 4663-4672, retrieved from https://zpascal.net/cvpr2018/Rad_Feature_Mapping_for_CVPR_2018_paper.pdf.
Rakelly et al., "Few-Shot Segmentation Propagation with Guided Networks," arXiv, 2018, pp. 1-10, retrieved from https://arxiv.org/abs/1806.07373.
Ravi et al., "Optimization as a Model for Few-Shot Learning," ICLR, 2017, pp. 1-11.

(56) References Cited

OTHER PUBLICATIONS

Reed et al., "Few-shot autoregressive density estimation: Towards learning to learn distributions," ICLR, 2018, pp. 1-11.

Rezende et al., "One-Shot Generalization in Deep Generative Models," Proceedings of the 33rd International Conference on Machine Learning, JMLR: W&CP vol. 48, 2016, 10 pages, retrieved from https://arxiv.org/abs/1603.05106.

Santoro et al., "Meta-Learning with Memory-Augmented Neural Networks," Proceedings of the 33 rd International Conference on Machine Learning, 2016, 9 pages.

Shaban et al., "One-Shot Learning for Semantic Segmentation," CVPR, 2017, 17 pages, retrieved from https://arxiv.org/abs/1709.03410.

Shepard et al., "Mental Rotation of Three-Dimensional Objects," American Association for the Advancement of Science, vol. 171, No. 3972, Feb. 19, 1971, pp. 701-703.

Snell et al., "Prototypical Networks for Few-shot Learning," 31st Conference on Neural Information Processing Systems, 2017, pp. 1-11.

Srivastava et al., "Dropout: A Simple Way to Prevent Neural Networks from Overfitting," Journal of Machine Learning Research, vol. 15, 2014, pp. 1929-1958.

Su et al., "Render for CNN: Viewpoint Estimation in Images Using CNNs Trained with Rendered 3D Model Views," ICCV, 2015, pp. 2686-2694, retrieved from https://www.cv-foundation.org/openaccess/content_iccv_2015/papers/Su_Render_for_CNN_ICCV_2015_paper.pdf.

Sundermeyer et al., "Implicit 3D Orientation Learning for 6D Object Detection from RGB Images," ECCV, 2018, pp. 1-17, retrieved from http://openaccess.thecvf.com/content_ECCV_2018/papers/Martin_Sundermeyer_Implicit_3D_Orientation_ECCV_2018_paper.pdf.

Suwajanakorn et al., "Discovery of Latent 3D Keypoints via End-to-end Geometric Reasoning," 32nd Conference on Neural Information Processing Systems, 2018, pp. 1-12.

Tekin et al., "Real-Time Seamless Single Shot 6D Object Pose Prediction," arXiv, 2017, 16 pages, retrieved from https://arxiv.org/pdf/1711.08848v2.pdf.

Tenenbaum et al., "How to Grow a Mind: Statistics, Structure, and Abstraction," Science, Mar. 11, 2011, vol. 331, pp. 1279-1285.

Thewlis et al., "Unsupervised learning of object landmarks by factorized spatial embeddings," IEEE International Conference on Computer Vision, 2017, pp. 5916-5925, retrieved from http://openaccess.thecvf.com/content_iccv_2017/html/Thewlis_Unsupervised_Learning_of_ICCV_2017_paper.html.

Tremblay et al., "Synthetically Trained Neural Networks for Learning Human-Readable Plans from Real-World Demonstrations," IEEE International Conference on Robotics and Automation, 2018, 9 pages, retrieved from https://arxiv.org/abs/1805.07054.

Tremblay et al., "Deep Object Pose Estimation for Semantic Robotic Grasping of Household Objects," 2nd Conference on Robot Learning, 2018, pp. 1-11.

Tulsiani et al., "Pose Induction for Novel Object Categories," IEEE International Conference on Computer Vision, 2015, pp. 64-72, retrieved from http://openaccess.thecvf.com/content_iccv_2015/html/Tulsiani_Pose_Induction_for_ICCV_2015_paper.html.

Tulsiani et al., "Viewpoints and Keypoints," IEEE Conference on Computer Vision and Pattern Recognition, 2015, pp. 1510-1519, retried from https://www.cv-foundation.org/openaccess/content_cvpr_2015/html/Tulsiani_Viewpoints_and_Keypoints_2015_CVPR_paper.html.

Vinyals et al., "Matching Networks for One Shot Learning," NIPS 2016, 2016, pp. 1-12, retrieved from https://www.semanticscholar.org/paper/Matching-Networks-for-One-Shot-Learning-Vinyals-Blundell/be1bb4e4aa1fcf70281b4bd24d8cd31c04864bb6.

\* cited by examiner

FEW-SHOT VIEWPOINT ESTIMATION

CLAIM OF PRIORITY

This application claims the benefit of U.S. Provisional Application No. 62/801,498 titled "FEW-SHOT VIEWPOINT ESTIMATION," filed Feb. 5, 2019, the entire contents of which is incorporated herein by reference.

TECHNICAL FIELD

The present disclosure relates to generating object viewpoints for an image.

BACKGROUND

Estimating the viewpoint (e.g. azimuth, elevation, and cyclorotation) of rigid objects, relative to the camera, is a fundamental problem in three-dimensional (3D) computer vision. It is vital to applications such as robotics, 3D model retrieval, and reconstruction. This estimation is necessary because a single image, which is a projection from 3D, will not have sufficient information to determine the viewpoint of various objects in the image. While viewpoint estimation for an object could be manually provided by humans, such work would be labor intensive and prone to imprecision.

To date, techniques used to provide viewpoint estimation have relied on convolutional neural networks (CNNs) trained to infer viewpoint estimation for objects in an image. However, these networks have been limited to providing viewpoint estimation for known categories of objects (i.e. categories of objects with many labeled examples from which the network has been trained). Thus, to address unknown categories of objects (i.e. categories of objects that the network has not encountered during training), the networks have been required to be re-trained using new examples for the unknown categories, which in turn has required annotating thousands of new examples for use in the re-training, which is labor intensive.

There is a need for addressing these issues and/or other issues associated with the prior art.

SUMMARY

A method, computer readable medium, and system are disclosed for few-shot viewpoint estimation. In use, a category-specific viewpoint estimation block of a neural network is trained to learn a unique viewpoint estimation network capable of inferring viewpoint estimations for any new object category. Additionally, a plurality of images of the new category are processed, by a category-agnostic feature extraction block of the neural network, to extract features of an object in each of the images. Further, using the features, the unique viewpoint estimation network capable of inferring viewpoint estimations for the new object category is learned.

DETAILED DESCRIPTION

Figure 1:
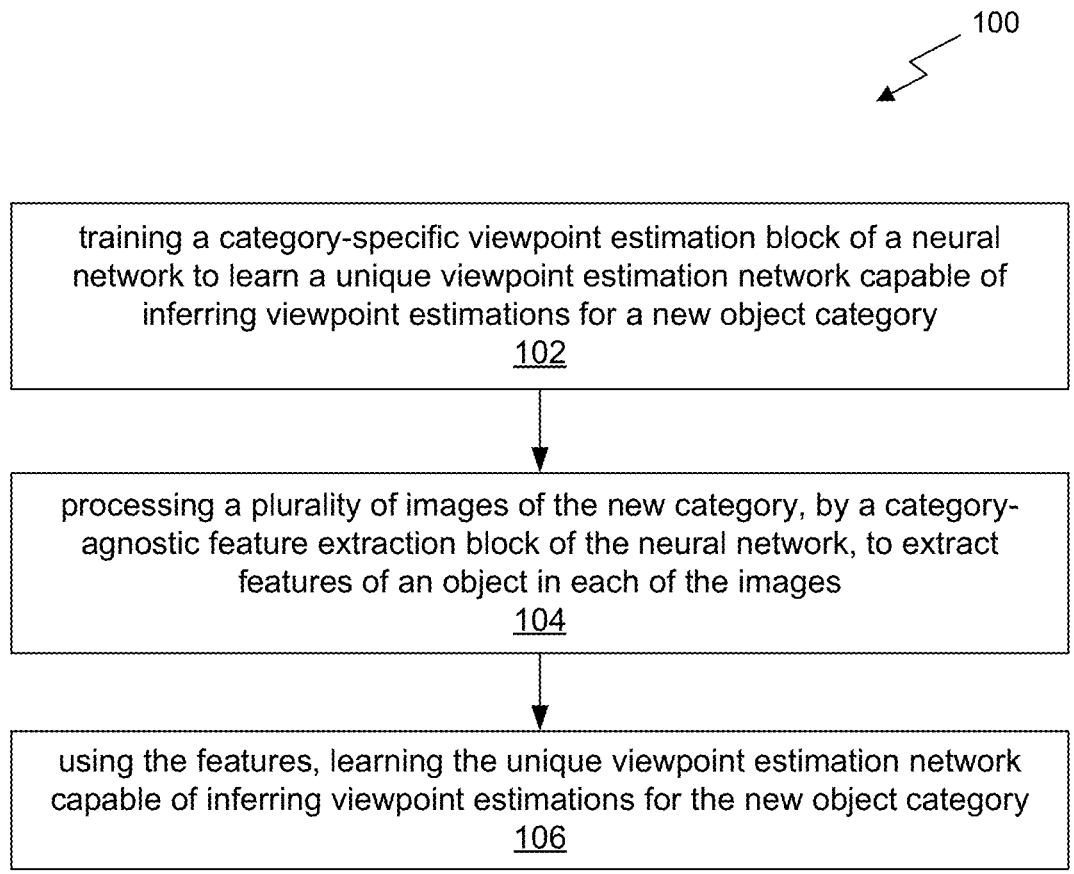
FIG. 1 illustrates a flowchart of a method for learning a unique viewpoint estimation network capable of inferring viewpoint estimations for a new object category, in accordance with an embodiment.

FIG. 1 illustrates a flowchart of a method 100 for learning a unique viewpoint estimation network capable of inferring viewpoint estimations for a new object category, in accordance with an embodiment. The method 100 may be performed by a processing unit, a program, custom circuitry, or a combination thereof.

As shown in operation 102, a category-specific viewpoint estimation block of a neural network is trained to learn a unique viewpoint estimation network capable of inferring viewpoint estimations for a new object category. In one embodiment, meta-learning may be used to train the category-specific viewpoint estimation block to learn the unique viewpoint estimation network. Further description of the meta-learning is described with reference to additional embodiments below.

In another embodiment, the category-specific viewpoint estimation block may be trained to be able to learn the unique viewpoint estimation network from a few (e.g. 3) example images input for the new object category. Thus, the unique viewpoint estimation network may be learned specifically for the purpose of inferring viewpoint estimations for the new object category. The new object category refers to a category of objects for which the category-specific viewpoint estimation block has not yet been trained.

Additionally, as shown in operation 106, a plurality of images of the new category are processed, by a category-agnostic feature extraction block of the neural network, to extract features of an object in each of the images. In one embodiment, the features of the object extracted by the category-agnostic feature extraction block may include a multi-peak heatmap for locations of visible keypoints on the object. In another embodiment, the features of the object extracted by the category-agnostic feature extraction block may include a set of high-level convolutional features of the object.

Further, as shown in operation 104, using the features, the unique viewpoint estimation network capable of inferring viewpoint estimations for the new object category is learned. In this way, the unique viewpoint estimation network may be used to process example images for a new object category to infer viewpoint estimations for the new object category.

More illustrative information will now be set forth regarding various optional architectures and features with which the foregoing framework may be implemented, per the desires of the user. It should be strongly noted that the following information is set forth for illustrative purposes and should not be construed as limiting in any manner. Any of the following features may be optionally incorporated with or without the exclusion of other features described.

Figure 2:
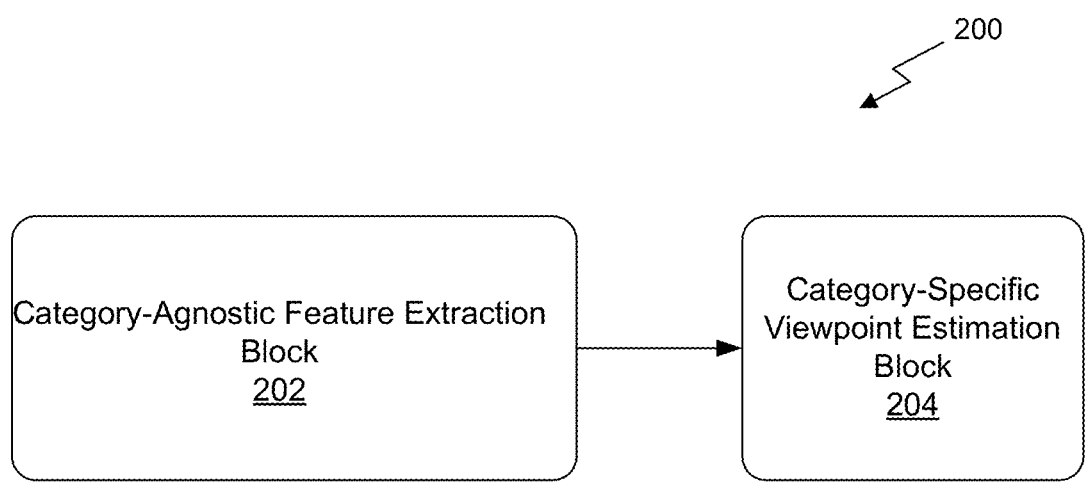
FIG. 2 illustrates a block diagram of a neural network framework for learning a unique viewpoint estimation network capable of inferring viewpoint estimations for a new object category, in accordance with an embodiment.

FIG. 2 illustrates a block diagram of a neural network framework 200 for learning a unique viewpoint estimation network capable of inferring viewpoint estimations for a new object category, in accordance with an embodiment.

As shown, the framework includes two main components: a category-agnostic feature extraction block 202 and a category-specific viewpoint estimation block 204. The category-agnostic feature extraction block 202 operates to extract general features from images that help to improve the accuracy of a downstream viewpoint estimation task. The category-agnostic feature extraction block 202 outputs the extracted features which are used as input to the category-specific viewpoint estimation block 204.

The category-specific viewpoint estimation block 204 operates to learn a unique viewpoint estimation network for a new object category, and further to use the unique viewpoint estimation network to compute the viewpoint of all objects of the new object category (e.g. new object type). In one embodiment, the category-specific viewpoint estimation block 204 computes viewpoint by detecting a unique set of semantic keypoints (e.g. containing 3D, 2D and depth values) via a unique viewpoint estimation network that uses a category-specific feature extraction module ($f_{\theta_{cat}}$) and a category-specific keypoint detection module ($f_{\theta_{key}}$).

Initially, the category-agnostic feature extraction block 202 and the category-specific viewpoint estimation block 204 are trained using a training set $S^{train}$ containing a finite set of object categories. In one embodiment, standard supervised learning is used to train the category-agnostic feature extraction block 202 and its weights are fixed for all subsequent training stages. In another embodiment, meta-learning is used to train the category-specific viewpoint estimation block 204. This meta-learning training procedure is designed to make the category-specific viewpoint estimation block 204 an effective "learner" capable of learning the unique viewpoint estimation network from a few images for a new object category, where the learned unique viewpoint estimation network is then capable of computing the viewpoint of all objects of the new object category. In other words, the trained category-specific viewpoint estimation block 204 can be further fine-tuned with a few image examples of an unknown (new) category, to form the unique viewpoint estimation network, which is able to generalize well to other examples of that category.

To this end, at inference time when a new object category is encountered (i.e. an object category not present during training) along with a few of its labeled image examples from another set $S^{test}$, the unique viewpoint estimation network is created for the new object category, its weights are initialized with the optimal weights $\theta^*_{cat}$ and $\theta^*_{key}$ learned during meta-learning, and the unique viewpoint estimation network is fine-tuned with its labeled image examples. This results in a category-specific viewpoint network that generalizes well to other examples of this new object category.

The following figures and relate descriptions describe the neural network architecture 200 and the training procedure of each component in more detail.

Figure 3:
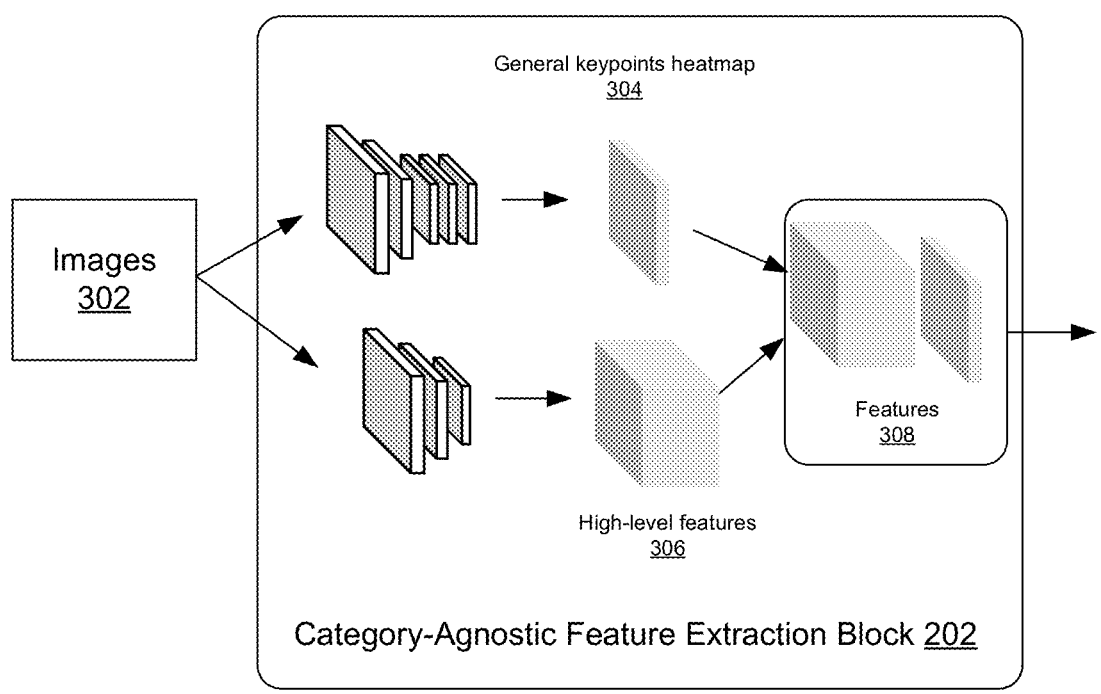
FIG. 3 illustrates a block diagram of the category-agnostic feature extraction block of the framework of FIG. 2, in accordance with an embodiment.

FIG. 3 illustrates the category-agnostic feature extraction block 202 of the framework 200 of FIG. 2, in accordance with an embodiment.

The first stage of the pipeline is the category-agnostic feature extraction block 202, which is trained and used to receive images 302 as input and then extract features from those images 302 without regard to an object's category. In one embodiment, the category-agnostic feature extraction block 202 consists of two ResNet-18-style networks: the first trained to extract a multi-peak heatmap for the locations of some or all of the visible general keypoints, and the second whose first four convolutional blocks compute an identically-sized set of high-level convolutional features and is trained to detect 8 semantic keypoints for all categories by optimizing the loss as described below in more detail with reference to Equation 6. The multi-peak heatmap and high-level features are concatenated as the extracted features 308 and are then input to the category-specific viewpoint estimation block 204.

The category-agnostic feature extraction block 202 is trained, in one embodiment, via standard supervised Stochastic gradient descent (SGD) learning. Once trained, its weights are fixed for all subsequent steps.

Figure 4:
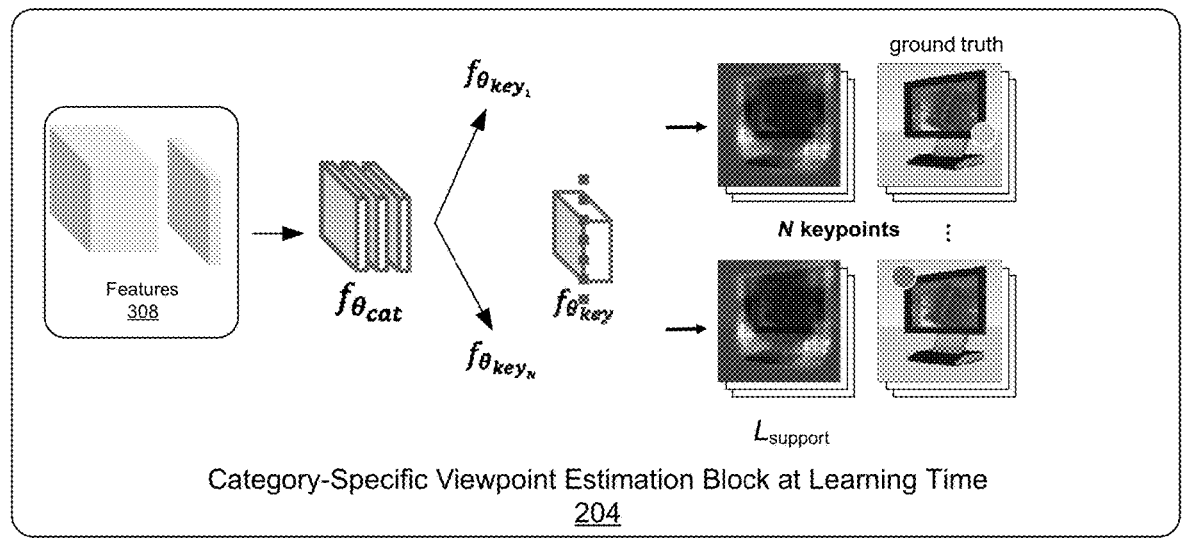
FIG. 4 illustrates a block diagram of the category-specific viewpoint estimation block of the framework of FIG. 2, in accordance with an embodiment.
Figure 4:
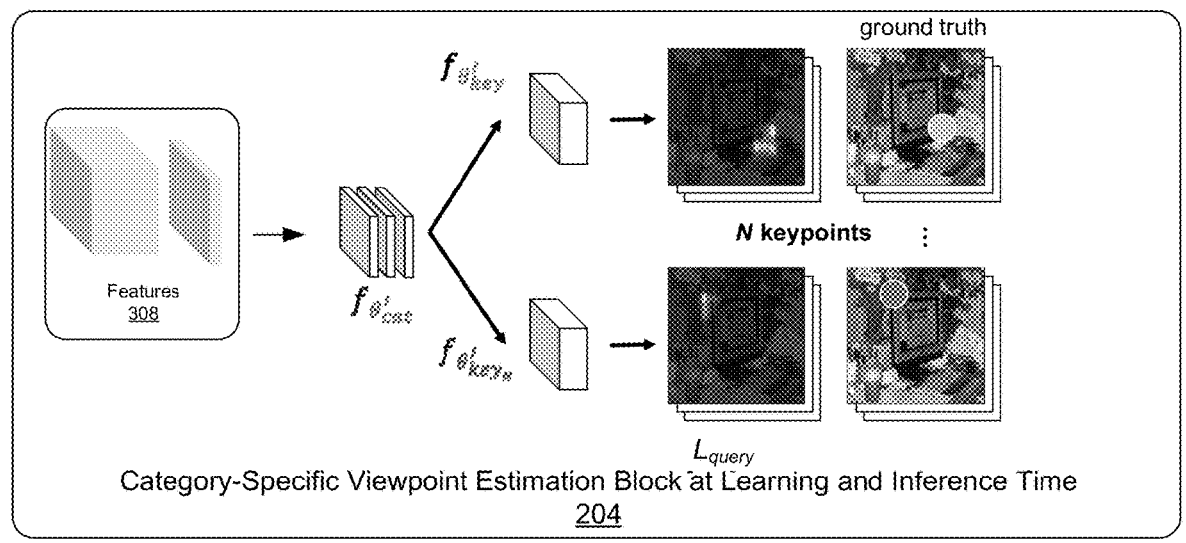

FIG. 4 illustrates a block diagram of the category-specific viewpoint estimation block 204 of the framework 200 of FIG. 2, in accordance with an embodiment. In particular, FIG. 4 illustrates an instance of the category-specific viewpoint estimation block 204 during a training time, and a separate instance during an inferencing time (otherwise referred to as the unique viewpoint estimation network).

The category-specific viewpoint estimation block 204 is specific to each object category. It computes a 3D canonical shape for each category, along with its 2D image projection and depth values. It further relates these quantities to compute a viewpoint of an object within that object category. Furthermore, the category-specific viewpoint estimation block 204 is trained via meta-learning to be an optimal few-shot "learner" for any new object category.

Architecture

Viewpoint Estimation Via Semantic Keypoints

It is assumed that the category-specific viewpoint estimation block 204 has no knowledge of the 3D shape of any object in a new object category. So, to compute viewpoint for objects in that new object category, the category-specific viewpoint estimation block 204 is trained to estimate a set of 3D points $\{(x_k, y_k, z_k)|k=1 \ldots N_c\}$, which together represent a canonical shape for the entire category $T_c$ in an object-centric coordinate system (e.g. for the object category "chairs," the set of 3D $point_2$ may include the corners of a stick figure representation of a prototypical chair with a back, a seat, and 4 legs). Additionally, for each 3D point k, the category-specific viewpoint estimation block 204 detects its 2D image projection ($u_k$, $v_k$) and estimates its associated depth $d_k$. The collective values ($x_k$, $y_k$, $z_k$), ($u_k$, $v_k$), $d_k$ of a point k are referred to as a "semantic keypoint." Filially, the viewpoint (rotation) of an object is obtained by solving the set of equations that relate each of the k rotated and projected 3D canonical points ($x_k$, $y_k$, $z_k$) to its 2D image location and depth estimate ($u_k$, $v_k$, $d_k$), via orthogonal Procrustes. Note that the category-specific viewpoint estimation block 204 is able to detect projections of all visible and invisible 3D canonical points, thus providing more data for estimating viewpoint.

Semantic Keypoint Estimation

To locate the 2D image projection ($u_k$, $v_k$) of each 3D keypoint k, the output of the network is a 2D heatmap $h_k$(u, v), which predicts the probability of the point being located at (u, v). It is produced by a spatial softmax layer. We obtain the final image coordinates ($u_k$, $v_k$) via a weighted sum of the row (u) and column (v) values as:

$$(u_k, v_k) = \sum_{u,v} (u, v) \cdot h_k(u, v) \qquad \text{Equation 1}$$

The network similarly computes a 2D map of depth values $c_k(u, v)$ that is of the same size as $h_k(u, v)$, along with three more maps $$m_k^{i=\{x,y,z\}}(u, v)$$

for each dimension of its 3D canonical keypoint. The final depth estimate $d_k$ and 3D keypoint $(x_k, y_k, z_k)$ is computed as:

$$d_k = \sum_{u,v} c_k(u, v),\qquad \text{Equation 2}$$

$$(x_k, y_k, z_k) = \sum_{u,v} m_k^{i=\{x,y,z\}}(u, v) \cdot h_k(u, v)$$

Category-Specific Keypoints Estimation

Given a category $T_c$, the category-specific viewpoint estimation block 204 must detect its unique $N_c$ semantic keypoints via a category-specific feature extractor $f_{\theta cat}$ followed by a set of category-specific semantic keypoint detectors $\{f_{\theta key_k}|k=1 \ldots N_c\}$. Each keypoint detector $f_{\theta key_k}$ detects one unique category-specific semantic keypoint $k$, while the feature extractor $f_{\theta cat}$ computes the common features required by all of them. Since the category-specific viewpoint estimation block 204 must adapt to multiple different categories with different numbers of semantic keypoints, it cannot have a fixed number of pre-defined keypoint detectors. To flexibly change the number of keypoint detectors for each novel object category, a meta-Siamese architecture can be used, which operates as follows. For each new category $T_c$, a generic pre-trained keypoint detector $(f_{\theta key})$ is replicated $N_c$ times and each copy is trained to detect one unique keypoint $k$ of the new category, thus creating a specialized keypoint-detector with a unique and different number of semantic keypoints $\{f_{\theta keyk}|k=1 \ldots N_c\}$ for each new category.

Training

The goal is to train the category-specific viewpoint estimation block 204 to be an effective few-shot learner. In other words, its learned feature extractor $f_{\theta^*cat}$ and semantic keypoint detector $f_{\theta^*key}$, after being fine-tuned with a few examples of a new category, should effectively extract features for the new category and detect each of its unique keypoints, respectively. To learn the optimal weights $\theta^* = \{\theta^*_{cat}, \theta^*_{key}\}$ that make category-specific viewpoint estimation block 204 amenable to few-shot fine-tuning without catastrophically over-fitting to a new object category, the Model-Agnostic Meta-Learning (MAML) algorithm is utilized.

MAML optimizes a special meta-objective using a standard optimization algorithm, e.g. SGD. In standard supervised learning the objective is to minimize only the training loss for a task during each iteration of optimization. However, the meta-objective in MAML is to explicitly minimize, during each training iteration, the generalization loss for a task after a network has been trained with a few of its labeled examples. Furthermore, it samples a random task from a set of many such related tasks available for training during each iteration. The specific meta-training algorithm to learn the optimal weights $\theta^* = \{\theta^*_{cat}, \theta^*_{key}\}$ for the category-specific viewpoint estimation block 204 is described below.

For viewpoint estimation each object category is a unique task. During each iteration of meta-training, a random task is sampled from $S_{train}$. A task includes a support set $D^s_c$ and a query set $D^q_c$, each containing 10 and 3 labeled image examples, respectively, of an object category $T_c$. The term "shot" refers to the number of examples in the support set $D^s_c$. For this category, containing $N_c$ semantic keypoints, the generic keypoint detector $(f_{\theta key})$ is replicated $N_c$ times to construct its unique meta-Siamese keypoints detector with the parameters $$\tilde{\theta} \leftarrow [\theta_{cat}, \theta_{key_1}, \theta_{key_2}, \ldots \theta_{key_{N_c}}]$$

and each $\theta_{key_k}$ is initialized with $\theta_{key}$. The category-specific keypoint detector is used to estimate this task's support set's semantic keypoints and given their ground truth values, the following loss is computed:

$$\mathcal{L}^S_{Tc} = \lambda_{2D}\mathcal{L}_{2D} + \lambda_{3D}\mathcal{L}_{3D} + \lambda_d \mathcal{L}_d \qquad \text{Equation 3}$$

Where $\mathcal{L}_{2D}$, $\mathcal{L}_{3D}$, $\mathcal{L}_d$ are the average L2 regression losses for correctly estimating the semantic keypoints' 2D and 3D positions, and depth estimates, respectively. The $\lambda$ parameters control the relative importance of each loss term. The gradient of this loss $L^s_{Tc}$ with respect to the network's parameters $\tilde{\theta}$ is coupled and used in a single step of SGD to update $\tilde{\theta}$ to $\tilde{\theta}'$ with a learning rate of $\alpha$:

$$\tilde{\theta} \leftarrow \tilde{\theta} - \alpha \nabla_{\tilde{\theta}} \mathcal{L}^S_{Tc} \qquad \text{Equation 4}$$

Next, with the updated model parameters $\tilde{\theta}'$, the loss $L^q_{Tc}$ is computed for the query set $D^q_c$ of this object category. To compute the query loss, in addition to the loss terms described in Equation 3 above, a weighted concentration loss term is used:

$$\mathcal{L}_{con} = \frac{1}{N_c} \sum_{k=1}^{N_c} \sum_{u,v} h_k(u, v) \| [u_k, v_k]^T - [u, v]^T \|^2, \qquad \text{Equation 5}$$

which forces the distribution of a 2D keypoint's heatmap $h_k(u, v)$ to be peaky around the predicted position $(u_k, v_k)$. This concentration loss term helps to improve the accuracy of 2D keypoint detection. The final query loss is:

$$\mathcal{L}^q_{Tc} = \lambda_{2D}\mathcal{L}_{2D} + \lambda_{3D}\mathcal{L}_{3D} + \lambda_d\mathcal{L}_d + \lambda_{con}\mathcal{L}_{con}. \qquad \text{Equation 6}$$

The generalization loss of the network $L^q_{Tc}$, after it has been trained with just a few examples of a specific category, serves as the final meta-objective that is minimized in each iteration of meta-training and the network's initial parameters $\theta$ are optimized with respect to its query loss $L^q_{Tc}$ using:

$$\theta_{cat} \leftarrow \theta_{cat} - \beta \nabla_{\theta_{cat}} \mathcal{L}^q_{Tc}(f_{\tilde{\theta}'}), \qquad \text{Equation 7}$$

$$\theta_{key} \leftarrow \theta_{key} - \beta \frac{1}{N_c} \sum_{k=1,N_c} [\nabla_{\theta_{key_k}} \mathcal{L}^q_{Tc}(f_{\tilde{\theta}'})]. \qquad \text{Equation 8}$$

The meta-training iterations are repeated until the viewpoint estimation block converges to $f_{\theta^*}$, as presented in Algorithm 1 below. Notice that in Equation 1 the optimal weights for the generic keypoint detector $\theta_{key}$ are computed by averaging the gradients of all the duplicated keypoint $\theta_{key_k}$. This design feature of the network along with its shared category-level feature extractor with parameters $\theta_{cat}$ help to improve accuracy. They enable efficient use of all the available keypoints to learn the optimal values for $\theta_{cat}$ and $\theta_{key}$ during meta-training, which is especially important when training data is scarce.

---
Algorithm 1
---
1: Require: a set of tasks $S^{train}$
2: randomly initialize $\theta_{key}$ and $\theta_{cat}$
3: while training do
4:    sample one task $Tc \sim S^{train}$
5:    ▷ meta-Siamese keypoint detectors
6:    $\theta_{key_1}, \theta_{key_2}, \ldots, \theta_{key_{N_c}} \leftarrow \theta_{key}$
7:    ▷ viewpoint estimator
8:    $\tilde{\theta} \leftarrow [\theta_{cat}, \theta_{key_1}, \theta_{key_2}, \ldots, \theta_{key_{N_c}}]$
9:    ▷ update viewpoint estimator using support set
10:   $\tilde{\theta}' \leftarrow \tilde{\theta} - \alpha \nabla_{\tilde{\theta}} \mathcal{L}^s_{Tc}(f_{\tilde{\theta}})$
11:   ▷ metalearning optimization using query set
12:   $\theta_{cat} \leftarrow \theta_{cat} - \beta \nabla_{\theta_{cat}} \mathcal{L}^q_{Tc}(f_{\tilde{\theta}'})$
13:   $\theta_{key} \leftarrow \theta_{key} - \beta \frac{1}{N_c} \sum_{k=1, N_c} [\nabla_{\theta_{key_k}} \mathcal{L}^q_{Tc}(f_{\tilde{\theta}'})]$
14: end while
---

Inference

In one embodiment, the unique viewpoint estimation network is executed to infer the viewpoint estimations for the new object category. For example, executing the unique viewpoint estimation network may include: receiving as input to a category-agnostic feature extraction module a few example images for the new category; extracting, by the category-specific feature extraction module, features for objects of the new category, using the few example images; receiving as input to a category-specific keypoint detection module the features for objects of the new category; and processing, by the category-specific keypoint detection module, the features for objects of the new category to infer the viewpoint estimations for the new object category.

With respect to the specific embodiments described above, by way of example, the viewpoint estimation block $f_{\theta*}$, which is learned via meta-learning is able to perform the task of adapting to unseen (i.e. new) object categories. Similar to meta-training, a new category with the same or similar shot size as used for training is identified. The unique viewpoint estimation network $f_{\theta*}$ is constructed and fine-tuned with a few of the new category's image examples by minimizing the loss in Equation 3. This results in a unique optimal few-shot trained network $f_{\theta*'}$ for this new category.

To improve performance on unknown object categories for neural networks, the above figures and related descriptions provide a category-level few-shot viewpoint estimation technique which uses a unique framework that successfully adapts to unknown categories with few labeled examples and helps to improve performance on them with little additional annotation effort (i.e. that required for the few examples).

Machine Learning

Deep neural networks (DNNs), including deep learning models, developed on processors have been used for diverse use cases, from self-driving cars to faster drug development, from automatic image captioning in online image databases to smart real-time language translation in video chat applications. Deep learning is a technique that models the neural learning process of the human brain, continually learning, continually getting smarter, and delivering more accurate results more quickly over time. A child is initially taught by an adult to correctly identify and classify various shapes, eventually being able to identify shapes without any coaching. Similarly, a deep learning or neural learning system needs to be trained in object recognition and classification for it get smarter and more efficient at identifying basic objects, occluded objects, etc., while also assigning context to objects.

At the simplest level, neurons in the human brain look at various inputs that are received, importance levels are assigned to each of these inputs, and output is passed on to other neurons to act upon. An artificial neuron or perceptron is the most basic model of a neural network. In one example, a perceptron may receive one or more inputs that represent various features of an object that the perceptron is being trained to recognize and classify, and each of these features is assigned a certain weight based on the importance of that feature in defining the shape of an object.

A deep neural network (DNN) model includes multiple layers of many connected nodes (e.g., perceptrons, Boltzmann machines, radial basis functions, convolutional layers, etc.) that can be trained with enormous amounts of input data to quickly solve complex problems with high accuracy. In one example, a first layer of the DNN model breaks down an input image of an automobile into various sections and looks for basic patterns such as lines and angles. The second layer assembles the lines to look for higher level patterns such as wheels, windshields, and mirrors. The next layer identifies the type of vehicle, and the final few layers generate a label for the input image, identifying the model of a specific automobile brand.

Once the DNN is trained, the DNN can be deployed and used to identify and classify objects or patterns in a process known as inference. Examples of inference (the process through which a DNN extracts useful information from a given input) include identifying handwritten numbers on checks deposited into ATM machines, identifying images of friends in photos, delivering movie recommendations to over fifty million users, identifying and classifying different types of automobiles, pedestrians, and road hazards in driverless cars, or translating human speech in real-time.

During training, data flows through the DNN in a forward propagation phase until a prediction is produced that indicates a label corresponding to the input. If the neural network does not correctly label the input, then errors between the correct label and the predicted label are analyzed, and the weights are adjusted for each feature during a backward propagation phase until the DNN correctly labels the input and other inputs in a training dataset. Training complex neural networks requires massive amounts of parallel computing performance, including floating-point multiplications and additions. Inferencing is less compute-intensive than training, being a latency-sensitive process where a trained neural network is applied to new inputs it has not seen before to classify images, translate speech, and generally infer new information.

Inference and Training Logic

As noted above, a deep learning or neural learning system needs to be trained to generate inferences from input data.

Figure 5A:
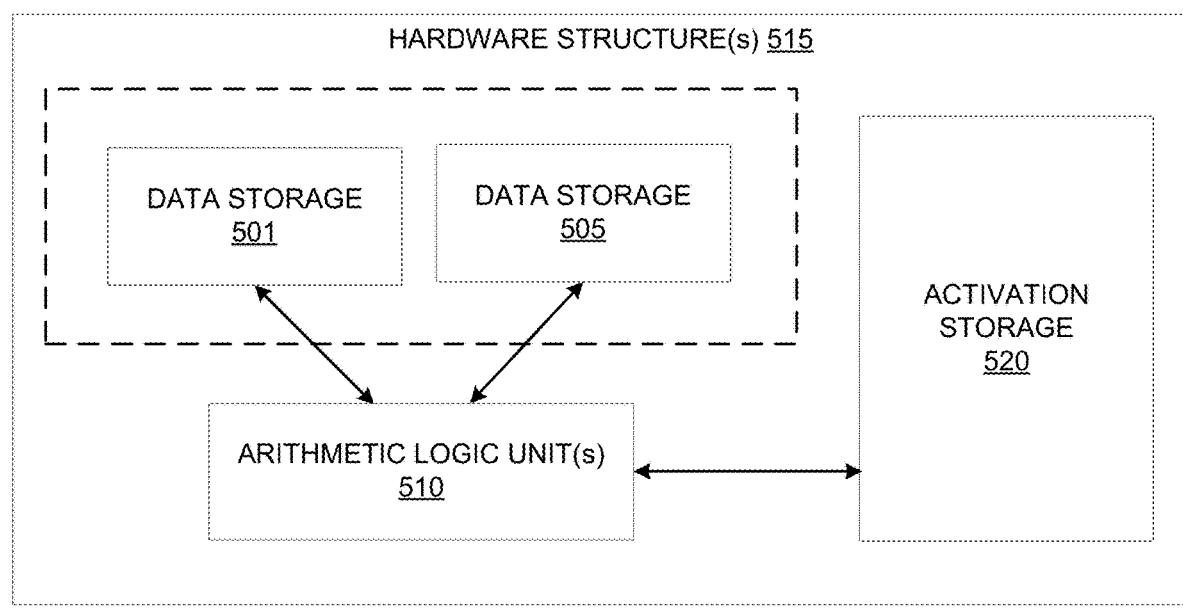
FIG. 5A illustrates inference and/or training logic, according to at least one embodiment.

Details regarding inference and/or training logic 515 for a deep learning or neural learning system are provided below in conjunction with FIGS. 5A and/or 5B.

In at least one embodiment, inference and/or training logic 515 may include, without limitation, a data storage 501 to store forward and/or output weight and/or input/output data corresponding to neurons or layers of a neural network trained and/or used for inferencing in aspects of one or more embodiments. In at least one embodiment data storage 501 stores weight parameters and/or input/output data of each layer of a neural network trained or used in conjunction with one or more embodiments during forward propagation of input/output data and/or weight parameters during training and/or inferencing using aspects of one or more embodiments. In at least one embodiment, any portion of data storage 501 may be included with other on-chip or off-chip data storage, including a processor's L1, L2, or L3 cache or system memory.

In at least one embodiment, any portion of data storage 501 may be internal or external to one or more processors or other hardware logic devices or circuits. In at least one embodiment, data storage 501 may be cache memory, dynamic randomly addressable memory ("DRAM"), static randomly addressable memory ("SRAM"), non-volatile memory (e.g., Flash memory), or other storage. In at least one embodiment, choice of whether data storage 501 is internal or external to a processor, for example, or comprised of DRAM, SRAM, Flash or some other storage type may depend on available storage on-chip versus off-chip, latency requirements of training and/or inferencing functions being performed, batch size of data used in inferencing and/or training of a neural network, or some combination of these factors.

In at least one embodiment, inference and/or training logic 515 may include, without limitation, a data storage 505 to store backward and/or output weight and/or input/output data corresponding to neurons or layers of a neural network trained and/or used for inferencing in aspects of one or more embodiments. In at least one embodiment, data storage 505 stores weight parameters and/or input/output data of each layer of a neural network trained or used in conjunction with one or more embodiments during backward propagation of input/output data and/or weight parameters during training and/or inferencing using aspects of one or more embodiments. In at least one embodiment, any portion of data storage 505 may be included with other on-chip or off-chip data storage, including a processor's L1, L2, or L3 cache or system memory. In at least one embodiment, any portion of data storage 505 may be internal or external to on one or more processors or other hardware logic devices or circuits. In at least one embodiment, data storage 505 may be cache memory, DRAM, SRAM, non-volatile memory (e.g., Flash memory), or other storage. In at least one embodiment, choice of whether data storage 505 is internal or external to a processor, for example, or comprised of DRAM, SRAM, Flash or some other storage type may depend on available storage on-chip versus off-chip, latency requirements of training and/or inferencing functions being performed, batch size of data used in inferencing and/or training of a neural network, or some combination of these factors.

In at least one embodiment, data storage 501 and data storage 505 may be separate storage structures. In at least one embodiment, data storage 501 and data storage 505 may be same storage structure. In at least one embodiment, data storage 501 and data storage 505 may be partially same storage structure and partially separate storage structures. In at least one embodiment, any portion of data storage 501 and data storage 505 may be included with other on-chip or off-chip data storage, including a processor's L1, L2, or L3 cache or system memory.

In at least one embodiment, inference and/or training logic 515 may include, without limitation, one or more arithmetic logic unit(s) ("ALU(s)") 510 to perform logical and/or mathematical operations based, at least in part on, or indicated by, training and/or inference code, result of which may result in activations (e.g., output values from layers or neurons within a neural network) stored in an activation storage 520 that are functions of input/output and/or weight parameter data stored in data storage 501 and/or data storage 505. In at least one embodiment, activations stored in activation storage 520 are generated according to linear algebraic and or matrix-based mathematics performed by ALU(s) 510 in response to performing instructions or other code, wherein weight values stored in data storage 505 and/or data 501 are used as operands along with other values, such as bias values, gradient information, momentum values, or other parameters or hyperparameters, any or all of which may be stored in data storage 505 or data storage 501 or another storage on or off-chip. In at least one embodiment, ALU(s) 510 are included within one or more processors or other hardware logic devices or circuits, whereas in another embodiment, ALU(s) 510 may be external to a processor or other hardware logic device or circuit that uses them (e.g., a co-processor). In at least one embodiment, ALUs 510 may be included within a processor's execution units or otherwise within a bank of ALUs accessible by a processor's execution units either within same processor or distributed between different processors of different types (e.g., central processing units, graphics processing units, fixed function units, etc.). In at least one embodiment, data storage 501, data storage 505, and activation storage 520 may be on same processor or other hardware logic device or circuit, whereas in another embodiment, they may be in different processors or other hardware logic devices or circuits, or some combination of same and different processors or other hardware logic devices or circuits. In at least one embodiment, any portion of activation storage 620 may be included with other on-chip or off-chip data storage, including a processor's L1, L2, or L3 cache or system memory. Furthermore, inferencing and/or training code may be stored with other code accessible to a processor or other hardware logic or circuit and fetched and/or processed using a processor's fetch, decode, scheduling, execution, retirement and/or other logical circuits.

In at least one embodiment, activation storage 520 may be cache memory, DRAM, SRAM, non-volatile memory (e.g., Flash memory), or other storage. In at least one embodiment, activation storage 520 may be completely or partially within or external to one or more processors or other logical circuits. In at least one embodiment, choice of whether activation storage 520 is internal or external to a processor, for example, or comprised of DRAM, SRAM, Flash or some other storage type may depend on available storage on-chip versus off-chip, latency requirements of training and/or inferencing functions being performed, batch size of data used in inferencing and/or training of a neural network, or some combination of these factors. In at least one embodiment, inference and/or training logic 515 illustrated in FIG. 5A may be used in conjunction with an application-specific integrated circuit ("ASIC"), such as Tensorflow® Processing Unit from Google, an inference processing unit (IPU) from Graphcore™, or a Nervana® (e.g., "Lake Crest") processor from Intel Corp. In at least one embodiment, inference and/or training logic 615 illustrated in FIG. 5A may be used in conjunction with central processing unit ("CPU") hardware, graphics processing unit ("GPU") hardware or other hardware, such as field programmable gate arrays ("FPGAs").

Figure 5B:
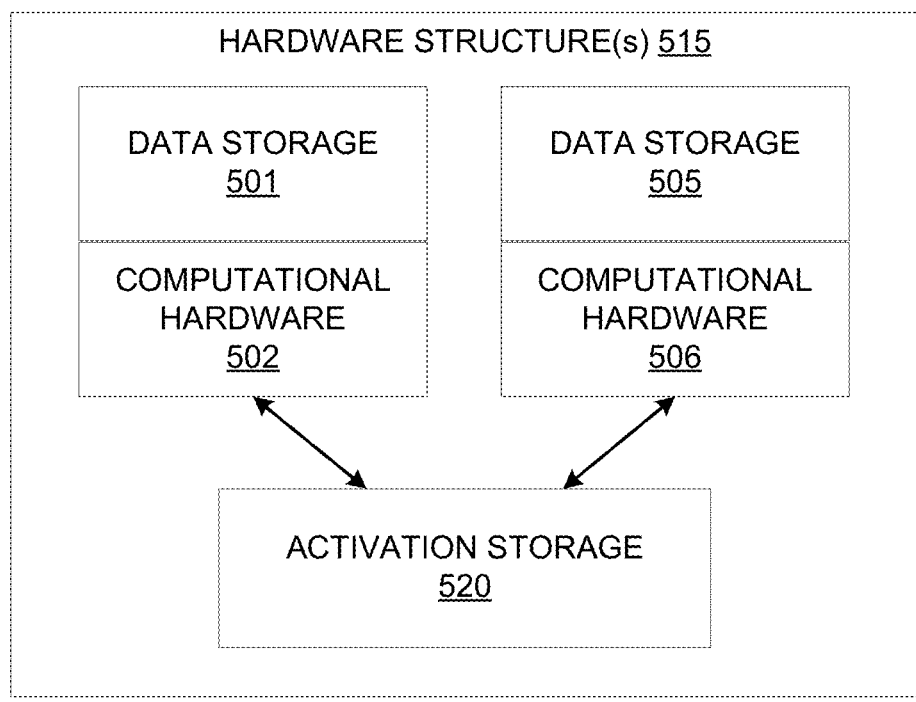
FIG. 5B illustrates inference and/or training logic, according to at least one embodiment.

FIG. 5B illustrates inference and/or training logic 515, according to at least one embodiment. In at least one embodiment, inference and/or training logic 515 may include, without limitation, hardware logic in which computational resources are dedicated or otherwise exclusively used in conjunction with weight values or other information corresponding to one or more layers of neurons within a neural network. In at least one embodiment, inference and/or training logic 515 illustrated in FIG. 5B may be used in conjunction with an application-specific integrated circuit (ASIC), such as Tensorflow® Processing Unit from Google, an inference processing unit (IPU) from Graphcore™, or a Nervana® (e.g., "Lake Crest") processor from Intel Corp. In at least one embodiment, inference and/or training logic 515 illustrated in FIG. 5B may be used in conjunction with central processing unit (CPU) hardware, graphics processing unit (GPU) hardware or other hardware, such as field programmable gate arrays (FPGAs). In at least one embodiment, inference and/or training logic 515 includes, without limitation, data storage 501 and data storage 505, which may be used to store weight values and/or other information, including bias values, gradient information, momentum values, and/or other parameter or hyperparameter information. In at least one embodiment illustrated in FIG. 5B, each of data storage 501 and data storage 505 is associated with a dedicated computational resource, such as computational hardware 502 and computational hardware 506, respectively. In at least one embodiment, each of computational hardware 506 comprises one or more ALUs that perform mathematical functions, such as linear algebraic functions, only on information stored in data storage 501 and data storage 505, respectively, result of which is stored in activation storage 520.

In at least one embodiment, each of data storage 501 and 505 and corresponding computational hardware 502 and 506, respectively, correspond to different layers of a neural network, such that resulting activation from one "storage/computational pair 501/502" of data storage 501 and computational hardware 502 is provided as an input to next "storage/computational pair 505/506" of data storage 505 and computational hardware 506, in order to mirror conceptual organization of a neural network. In at least one embodiment, each of storage/computational pairs 501/502 and 505/506 may correspond to more than one neural network layer. In at least one embodiment, additional storage/computation pairs (not shown) subsequent to or in parallel with storage computation pairs 501/502 and 505/506 may be included in inference and/or training logic 515.

Neural Network Training and Deployment

Figure 6:
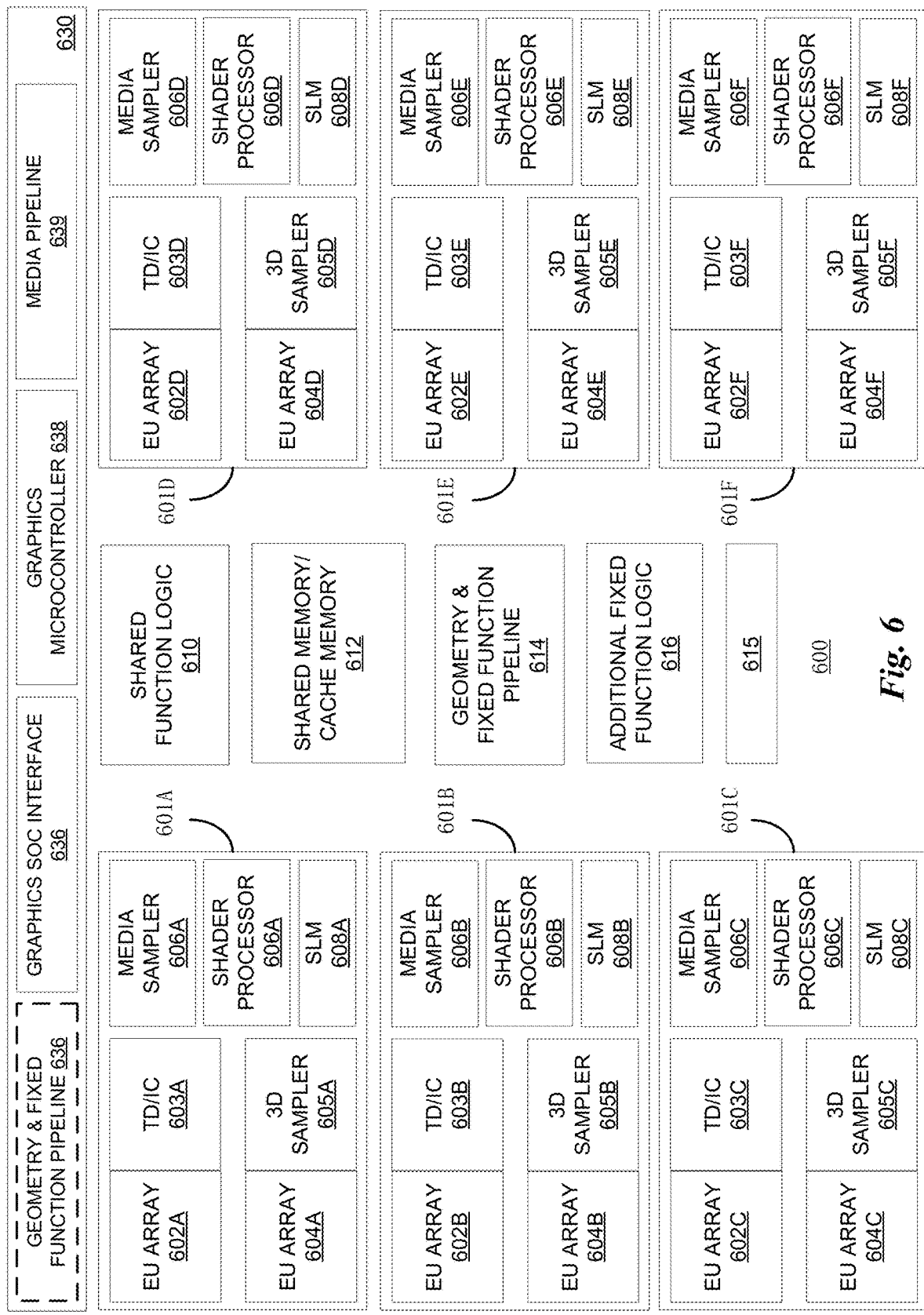
FIG. 6 illustrates training and deployment of a neural network, according to at least one embodiment.

FIG. 6 illustrates another embodiment for training and deployment of a deep neural network. In at least one embodiment, untrained neural network 606 is trained using a training dataset 602. In at least one embodiment, training framework 604 is a PyTorch framework, whereas in other embodiments, training framework 604 is a Tensorflow, Boost, Caffe, Microsoft Cognitive Toolkit/CNTK, MXNet, Chainer, Keras, Deeplearning4j, or other training framework. In at least one embodiment training framework 604 trains an untrained neural network 606 and enables it to be trained using processing resources described herein to generate a trained neural network 608. In at least one embodiment, weights may be chosen randomly or by pre-training using a deep belief network. In at least one embodiment, training may be performed in either a supervised, partially supervised, or unsupervised manner.

In at least one embodiment, untrained neural network 606 is trained using supervised learning, wherein training dataset 602 includes an input paired with a desired output for an input, or where training dataset 602 includes input having known output and the output of the neural network is manually graded. In at least one embodiment, untrained neural network 606 is trained in a supervised manner processes inputs from training dataset 602 and compares resulting outputs against a set of expected or desired outputs. In at least one embodiment, errors are then propagated back through untrained neural network 606. In at least one embodiment, training framework 604 adjusts weights that control untrained neural network 606. In at least one embodiment, training framework 604 includes tools to monitor how well untrained neural network 606 is converging towards a model, such as trained neural network 608, suitable to generating correct answers, such as in result 614, based on known input data, such as new data 612. In at least one embodiment, training framework 704 trains untrained neural network 606 repeatedly while adjust weights to refine an output of untrained neural network 606 using a loss function and adjustment algorithm, such as stochastic gradient descent. In at least one embodiment, training framework 604 trains untrained neural network 606 until untrained neural network 606 achieves a desired accuracy. In at least one embodiment, trained neural network 608 can then be deployed to implement any number of machine learning operations.

In at least one embodiment, untrained neural network 606 is trained using unsupervised learning, wherein untrained neural network 606 attempts to train itself using unlabeled data. In at least one embodiment, unsupervised learning training dataset 602 will include input data without any associated output data or "ground truth" data. In at least one embodiment, untrained neural network 606 can learn groupings within training dataset 602 and can determine how individual inputs are related to untrained dataset 602. In at least one embodiment, unsupervised training can be used to generate a self-organizing map, which is a type of trained neural network 608 capable of performing operations useful in reducing dimensionality of new data 612. In at least one embodiment, unsupervised training can also be used to perform anomaly detection, which allows identification of data points in a new dataset 612 that deviate from normal patterns of new dataset 612.

In at least one embodiment, semi-supervised learning may be used, which is a technique in which in training dataset 602 includes a mix of labeled and unlabeled data. In at least one embodiment, training framework 604 may be used to perform incremental learning, such as through transferred learning techniques. In at least one embodiment, incremental learning enables trained neural network 608 to adapt to new data 612 without forgetting knowledge instilled within network during initial training.

Data Center

Figure 7:
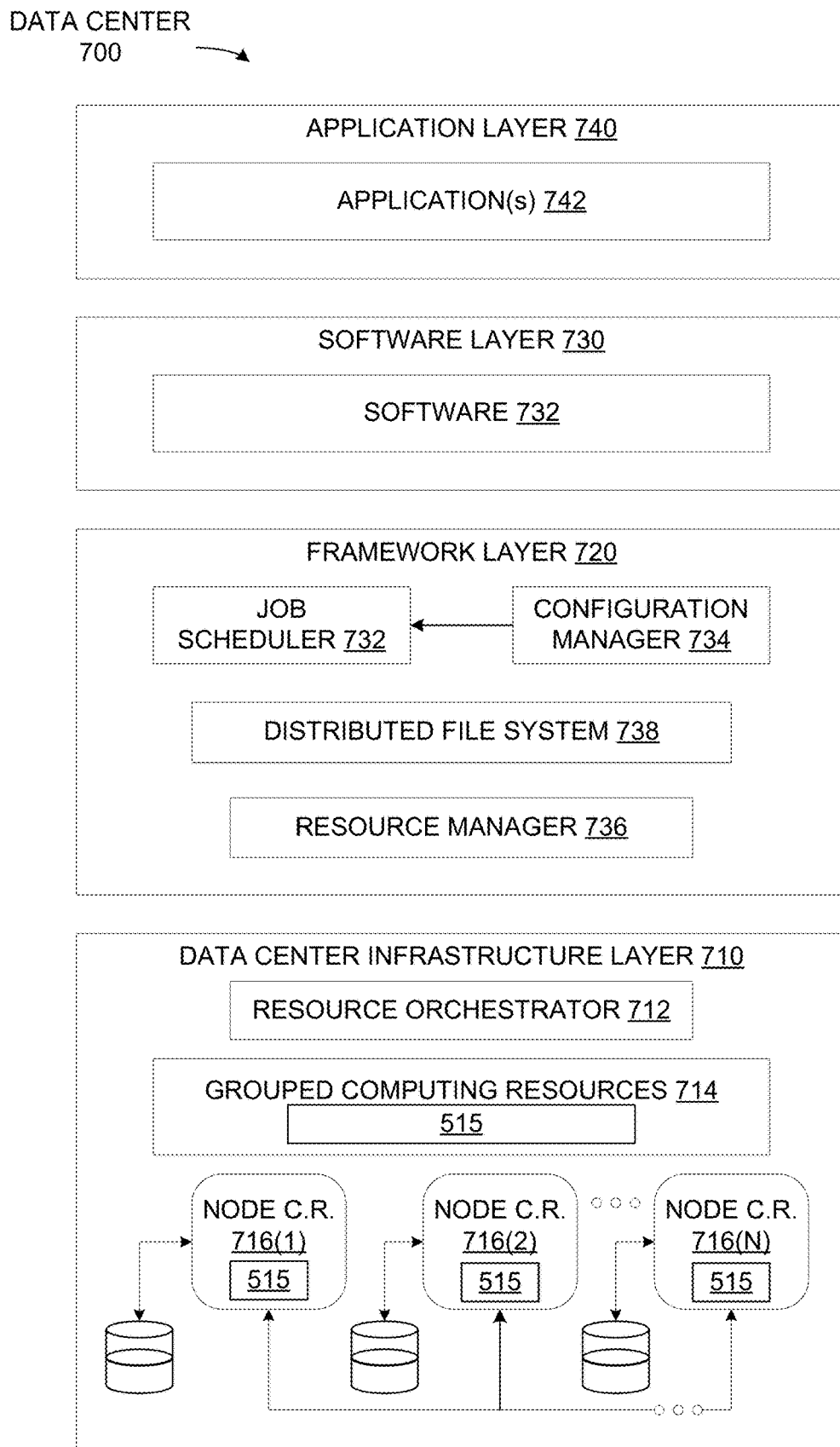
FIG. 7 illustrates an example data center system, according to at least one embodiment.

FIG. 7 illustrates an example data center 700, in which at least one embodiment may be used. In at least one embodiment, data center 700 includes a data center infrastructure layer 710, a framework layer 720, a software layer 730 and an application layer 740.

In at least one embodiment, as shown in FIG. 7, data center infrastructure layer 710 may include a resource orchestrator 712, grouped computing resources 714, and node computing resources ("node C.R.s") 716(1)-716(N), where "N" represents any whole, positive integer. In at least one embodiment, node C.R.s 716(1)-716(N) may include, but are not limited to, any number of central processing units ("CPUs") or other processors (including accelerators, field programmable gate arrays (FPGAs), graphics processors, etc.), memory devices (e.g., dynamic read-only memory), storage devices (e.g., said state or disk drives), network input/output ("NW I/O") devices, network switches, virtual machines ("VMs"), power modules, and cooling modules, etc. In at least one embodiment, one or more node C.R.s from among node C.R.s 716(1)-716(N) may be a server having one or more of above-mentioned computing resources.

In at least one embodiment, grouped computing resources 714 may include separate groupings of node C.R.s housed within one or more racks (not shown), or many racks housed in data centers at various geographical locations (also not shown). Separate groupings of node C.R.s within grouped computing resources 714 may include grouped compute, network, memory or storage resources that may be configured or allocated to support one or more workloads. In at least one embodiment, several node C.R.s including CPUs or processors may grouped within one or more racks to provide compute resources to support one or more workloads. In at least one embodiment, one or more racks may also include any number of power modules, cooling modules, and network switches, in any combination.

In at least one embodiment, resource orchestrator 722 may configure or otherwise control one or more node C.R.s 716(1)-716(N) and/or grouped computing resources 714. In at least one embodiment, resource orchestrator 722 may include a software design infrastructure ("SDI") management entity for data center 700. In at least one embodiment, resource orchestrator may include hardware, software or some combination thereof.

In at least one embodiment, as shown in FIG. 7, framework layer 720 includes a job scheduler 732, a configuration manager 734, a resource manager 736 and a distributed file system 738. In at least one embodiment, framework layer 720 may include a framework to support software 732 of software layer 730 and/or one or more application(s) 742 of application layer 740. In at least one embodiment, software 732 or application(s) 742 may respectively include web-based service software or applications, such as those provided by Amazon Web Services, Google Cloud and Microsoft Azure. In at least one embodiment, framework layer 720 may be, but is not limited to, a type of free and open-source software web application framework such as Apache Spark™ (hereinafter "Spark") that may utilize distributed file system 738 for large-scale data processing (e.g., "big data"). In at least one embodiment, job scheduler 732 may include a Spark driver to facilitate scheduling of workloads supported by various layers of data center 700. In at least one embodiment, configuration manager 734 may be capable of configuring different layers such as software layer 730 and framework layer 720 including Spark and distributed file system 738 for supporting large-scale data processing. In at least one embodiment, resource manager 736 may be capable of managing clustered or grouped computing resources mapped to or allocated for support of distributed file system 738 and job scheduler 732. In at least one embodiment, clustered or grouped computing resources may include grouped computing resource 714 at data center infrastructure layer 710. In at least one embodiment, resource manager 736 may coordinate with resource orchestrator 712 to manage these mapped or allocated computing resources.

In at least one embodiment, software 732 included in software layer 730 may include software used by at least portions of node C.R.s 716(1)-716(N), grouped computing resources 714, and/or distributed file system 738 of framework layer 720. One or more types of software may include, but are not limited to, Internet web page search software, e-mail virus scan software, database software, and streaming video content software.

In at least one embodiment, application(s) 742 included in application layer 740 may include one or more types of applications used by at least portions of node C.R.s 716(1)-716(N), grouped computing resources 714, and/or distributed file system 738 of framework layer 720. one or more types of applications may include, but are not limited to, any number of a genomics application, a cognitive compute, and a machine learning application, including training or inferencing software, machine learning framework software (e.g., PyTorch, TensorFlow, Caffe, etc.) or other machine learning applications used in conjunction with one or more embodiments.

In at least one embodiment, any of configuration manager 734, resource manager 736, and resource orchestrator 712 may implement any number and type of self-modifying actions based on any amount and type of data acquired in any technically feasible fashion. In at least one embodiment, self-modifying actions may relieve a data center operator of data center 800 from making possibly bad configuration decisions and possibly avoiding underutilized and/or poor performing portions of a data center.

In at least one embodiment, data center 700 may include tools, services, software or other resources to train one or more machine learning models or predict or infer information using one or more machine learning models according to one or more embodiments described herein. For example, in at least one embodiment, a machine learning model may be trained by calculating weight parameters according to a neural network architecture using software and computing resources described above with respect to data center 700. In at least one embodiment, trained machine learning models corresponding to one or more neural networks may be used to infer or predict information using resources described above with respect to data center 700 by using weight parameters calculated through one or more training techniques described herein.

In at least one embodiment, data center may use CPUs, application-specific integrated circuits (ASICs), GPUs, FPGAs, or other hardware to perform training and/or inferencing using above-described resources. Moreover, one or more software and/or hardware resources described above may be configured as a service to allow users to train or performing inferencing of information, such as image recognition, speech recognition, or other artificial intelligence services.

Inference and/or training logic 615 are used to perform inferencing and/or training operations associated with one or more embodiments. In at least one embodiment, inference and/or training logic 615 may be used in system FIG. 7 for inferencing or predicting operations based, at least in part, on weight parameters calculated using neural network training operations, neural network functions and/or architectures, or neural network use cases described herein.

As described herein, a method, computer readable medium, and system are disclosed for few-shot viewpoint estimation. In accordance with FIGS. 1-4, an embodiment may provide a neural network usable for performing inferencing operations and for providing inferenced data, where the neural network is stored (partially or wholly) in one or both of data storage 501 and 505 in inference and/or training logic 515 as depicted in FIGS. 5A and 5B. Training and deployment of the neural network may be performed as depicted in FIG. 6 and described herein. Distribution of the neural network may be performed using one or more servers in a data center 700 as depicted in FIG. 7 and described herein.

What is claimed is:

1. A method, comprising:
   at a device:
   training a viewpoint estimation block of a neural network, using meta-learning, to be able to learn a viewpoint estimation network capable of inferring viewpoint estimations for a new object category for which the viewpoint estimation block has not yet been trained;
   processing at least a few images of the new object category, by a feature extraction block of the neural network, to extract features of an object in each image of the at least a few images, wherein the feature extraction block is trained to extract general features from objects included in a finite set of object categories;
   using the features, learning the viewpoint estimation network that is capable of inferring viewpoint estimations for the new object category.

2. The method of claim 1, wherein the feature extraction block is trained using supervised learning and a training set of the finite set of object categories.

3. The method of claim 1, wherein the features of the object extracted by the feature extraction block include:
   a multi-peak heatmap for locations of visible keypoints on the object, and
   a set of high-level convolutional features of the object.

4. The method of claim 1, wherein the viewpoint estimation network uses a feature extraction module trained to extract features from objects included in the new object category and a keypoint detection module trained to detect a unique set of semantic keypoints for a target object of the new object category.

5. The method of claim 4, wherein the feature extraction module exacts the features from the objects included in the new object category from a few example images input for the new object category.

6. The method of claim 5, wherein the keypoint detection module uses the features extracted from the objects included in the new object category to detect a unique set of semantic keypoints for the target object of the new object category for use in computing a viewpoint of the target object.

7. The method of claim 6, wherein the unique set of semantic keypoints includes:
   a set of 3D points that represent a canonical shape for the new category of the target object,
   a 2D image projection for each of the 3D points, and
   a depth for each 2D image projection.

8. The method of claim 7, wherein the set of 3D points includes visible points and invisible points.

9. The method of claim 1, further comprising executing the viewpoint estimation network to infer the viewpoint estimations for the new object category.

10. The method of claim 9, wherein executing the viewpoint estimation network includes:
    receiving, as input to a feature extraction module trained to extract features from objects included in the new object category, a few example images for the new object category;
    extracting, by the feature extraction module, features for objects of the new object category, using the few example images;
    receiving, as input to a keypoint detection module trained to detect a unique set of semantic keypoints for a target object of the new object category, the features for objects of the new object category;
    processing, by the keypoint detection module, the features for objects of the new object category to infer the viewpoint estimations for the new object category.

11. A system, comprising:
    a non-transitory memory storage comprising instructions; and
    one or more processors in communication with the memory, wherein the one or more processors execute the instructions to:
    train a viewpoint estimation block of a neural network, using meta-learning, to be able to learn a viewpoint estimation network capable of inferring viewpoint estimations for a new object category for which the viewpoint estimation block has not yet been trained;
    process at least a few images of the new object category, by a feature extraction block of the neural network, to extract features of an object in each image of the at least a few images, wherein the feature extraction block is trained to extract general features from objects included in a finite set of object categories;
    using the features, learn the viewpoint estimation network that is capable of inferring viewpoint estimations for the new object category.

12. The system of claim 11, wherein the feature extraction block is trained using supervised learning and a training set of the finite set of object categories.

13. The system of claim 11, wherein the features of the object extracted by the feature extraction block include:
    a multi-peak heatmap for locations of visible keypoints on the object, and a set of high-level convolutional features of the object.

14. The system of claim 11, wherein the viewpoint estimation network uses a feature extraction module trained to extract features from objects included in the new object category and a keypoint detection module trained to detect a unique set of semantic keypoints for a target object of the new object category.

15. The system of claim 14, wherein the feature extraction module exacts the features from the objects included in the new object category from a few example images input for the new object category.

16. The system of claim 15, wherein the keypoint detection module uses the features extracted from the objects included in the new object category to detect a unique set of semantic keypoints for the target object of the new object category for use in computing a viewpoint of the target object.

17. The system of claim 16, wherein the unique set of semantic keypoints includes:
    a set of 3D points that represent a canonical shape for the new category of the target object,
    a 2D image projection for each of the 3D points, and
    a depth for each 2D image projection.

18. The system of claim 17, wherein the set of 3D points includes visible points and invisible points.

19. A non-transitory computer-readable media storing computer instructions that, when executed by one or more processors of a device, cause the one or more processors of the device to:
- train a viewpoint estimation block of a neural network, using meta-learning, to be able to learn a viewpoint estimation network capable of inferring viewpoint estimations for a new object category for which the viewpoint estimation block has not yet been trained;
- process at least a few images of the new object category, by a feature extraction block of the neural network, to extract features of an object in each image of the at least a few images, wherein the feature extraction block is trained to extract general features from objects included in a finite set of object categories;
- using the features, learn the viewpoint estimation network that is capable of inferring viewpoint estimations for the new object category.

\* \* \* \* \*